United States Patent [19]
Downey

[11] Patent Number: 5,239,686
[45] Date of Patent: Aug. 24, 1993

[54] TRANSCEIVER WITH RAPID MODE SWITCHING CAPABILITY

[75] Inventor: Walter J. Downey, San Jose, Calif.

[73] Assignee: Echelon Corporation, Palo Alto, Calif.

[21] Appl. No.: 693,965

[22] Filed: Apr. 29, 1991

[51] Int. Cl.$^5$ .................... H04B 1/44; H04B 1/04
[52] U.S. Cl. ...................... 455/78; 455/112; 455/127; 455/343
[58] Field of Search ............ 455/75, 76, 77, 78, 455/82, 83, 84, 86, 87, 89, 85, 106, 112, 114, 127, 295, 296, 317, 340, 343, 125; 370/94.1

[56] References Cited

U.S. PATENT DOCUMENTS

| | | | |
|---|---|---|---|
| 2,406,932 | 9/1946 | Tunick | 455/112 |
| 2,441,504 | 5/1948 | O'Brien | 455/112 |
| 3,139,596 | 6/1964 | Johanson et al. | 455/112 |
| 3,496,470 | 2/1970 | Richardson | 455/112 |
| 3,891,926 | 6/1975 | Ishman et al. | 455/125 |
| 4,254,504 | 3/1981 | Lewis et al. | 455/87 |
| 4,501,018 | 2/1985 | Shanley et al. | 455/86 |
| 4,627,099 | 12/1986 | Shimakata | 455/76 |
| 4,677,688 | 6/1987 | Yoshihara et al. | 455/82 |
| 4,870,699 | 9/1989 | Garner et al. | 455/76 |
| 4,908,600 | 3/1990 | Martinez | 455/75 |
| 4,918,690 | 4/1990 | Markkula | 370/94.1 |
| 5,101,505 | 3/1992 | Schiller et al. | 455/86 |

Primary Examiner—Reinhard J. Eisenzopf
Assistant Examiner—Lisa Charouel
Attorney, Agent, or Firm—Blakely, Sokoloff, Taylor & Zafman

[57] ABSTRACT

An RF transceiver achieves a fast switching time between transmit and receive modes by leaving the transmit oscillator on all the time. The transmit chain comprises a wide pulling voltage controlled crystal oscillator that operates at one third the transmit frequency followed by a frequency tripler/filter/amplifier chain that can be quickly switched on and off. By operating the transmit oscillator at one third the transmit frequency, only the third harmonic of the oscillator falls into the sensitive receive frequency band. Further isolation during the receive mode is achieved by gating off the frequency tripler, pulling the frequency of the oscillator out of the receive band, electronically detuning the harmonic filter and switching off the transmitter's power amplifier.

14 Claims, 4 Drawing Sheets

TRANSCEIVER WITH RAPID MODE SWITCHING CAPABILITY

FIELD OF THE INVENTION

The present invention relates to the field of radio frequency (RF) transceivers. More particularly, the invention relates to a transceiver that may be rapidly switched from the receive mode to the transmit mode and yet has high sensitivity to small incoming signals with no shielding between circuits.

BACKGROUND OF THE INVENTION

The design of an RF transceiver requires that the transmitter section and receiver section be isolated from one another in some manner so that the sensitivity of the receiver is not unduly degraded by the relatively high power transmit signal. A multitude of transceiver designs that are successful in accomplishing this objective are known by practitioners in the art.

A straightforward solution to the problem of transmitter/receiver isolation is to turn off all elements of the transmitter chain whenever the transceiver is operating in the receive mode. By shutting down the transmitter chain, particularly including the transmit oscillator, internally generated energy in the receive band of the transceiver can be virtually eliminated. Such temporal isolation of the transmitter and receiver generally exacts a penalty in response time of the transmitter, and hence a switching delay between receive and transmit modes, since highly stable oscillators require a relatively long period of time to start up and achieve stability prior to transmission. A typical crystal oscillator has a start up time on the order of a few milliseconds. In many systems, such as transceivers for voice communications, switching delays of a few milliseconds are entirely tolerable.

Transceivers for data communications, however, cannot tolerate lengthy switching delays since this would significantly reduce the communications bandwidth. In such systems, the transmitter must remain in a standby condition during the receive mode. Unless the transmitter and receiver operate on different channels (an impractical solution for a communications network with multiple transceivers) the transmitter must be isolated from the receiver by extensive RF shielding. For example, circuits may be housed within elaborate compartmented metal enclosures to confine stray radiation. Transceivers that require large amounts of shielding tend to be heavy, bulky and expensive.

The need addressed by the present invention is for a lightweight, compact and inexpensive RF transceiver that can switch rapidly from the receive mode to the transmit mode and yet still achieve high levels of receiver sensitivity. Such a transceiver, which can be constructed on a single unshielded circuit board, has particular application in a data communications network of the type described in U.S. Pat. No. 4,918,690.

SUMMARY OF THE INVENTION

The transceiver of the present invention achieves a fast switching time between transmit and receive modes by leaving the transmit oscillator on all the time. This eliminates the start up time of up to about five milliseconds that would otherwise be required for the transmit crystal oscillator.

The transmit chain comprises a wide pulling voltage controlled crystal oscillator that operates at one third the transmit frequency followed by a frequency tripler/filter/amplifier chain that can be quickly switched on and off. By operating the transmit oscillator at one third the transmit frequency, only the third harmonic of the oscillator falls into the sensitive receive frequency band. The oscillator is designed such that the amplitude of the third harmonic is much lower than the fundamental.

A gated frequency tripler is used to generate sufficient energy at the desired third harmonic and is gated off during the receive mode. To achieve even greater isolation for a sensitive receiver, the crystal oscillator is designed using a fundamental series mode of the crystal in such a way as to permit wide frequency pulling of the oscillator. The frequency pulling is used to pull the frequency of the oscillator far out of the receive band during the receive mode and allows the use of economical filters in the receive chain.

Still further isolation is achieved by electronically detuning the harmonic filter and by electronically switching off the transmitter's power amplifier during the receive mode.

BRIEF DESCRIPTION OF THE DRAWINGS

FIG. 2b is a schematic diagram of a circuit for the voltage controlled crystal oscillator section.

FIG. 2c is a schematic diagram of a circuit for the frequency tripler section.

FIG. 2d is a schematic diagram of a circuit for the harmonic filter section.

DETAILED DESCRIPTION OF THE INVENTION

In the following description, for purposes of explanation and not limitation, specific details are set forth, such as circuit implementations, component types, electrical characteristics, etc. in order to provide a thorough understanding of the present invention. However, it will be apparent to one skilled in the art that the present invention may be practiced in other embodiments that depart from these specific details. In other instances, detailed descriptions of well-known circuits and devices are omitted so as not to obscure the description of the present invention with unnecessary detail.

Figure 1:
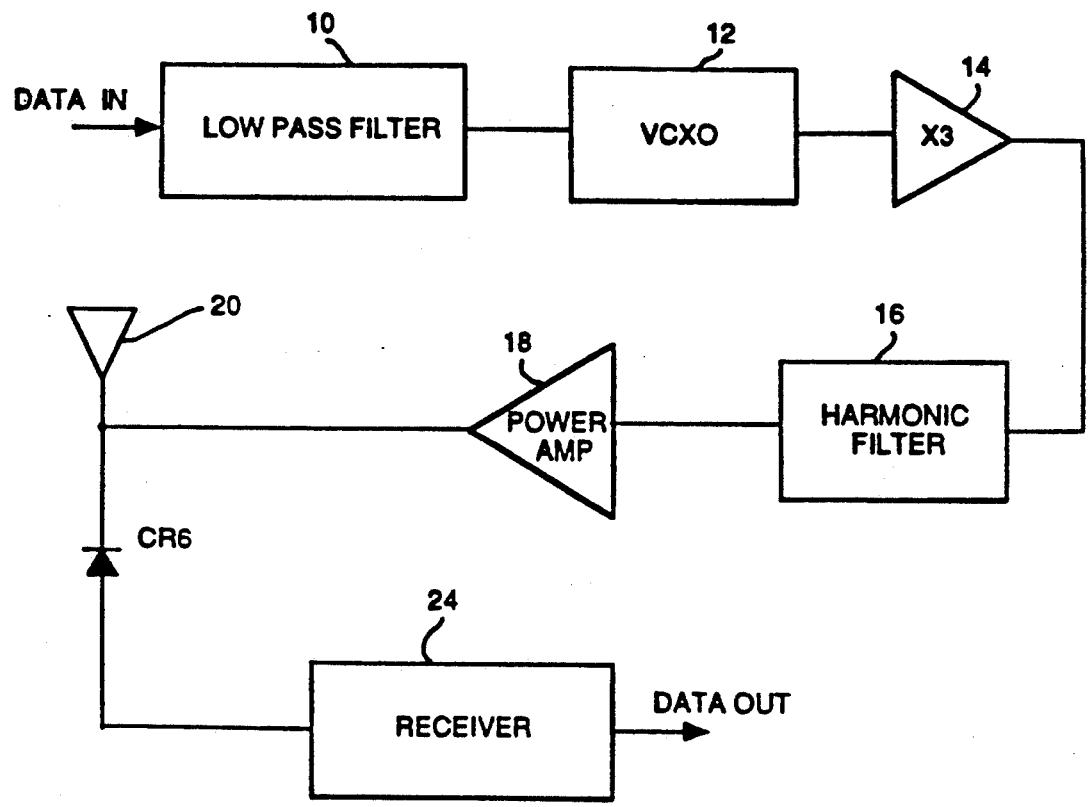
FIG. 1 is a functional block diagram of a transceiver according to the present invention.

FIG. 1 is a functional block diagram of an RF transceiver according to the present invention. Digital data to be transmitted on a communications network is supplied from a processing unit (not shown) associated with the transceiver and is asserted at low pass filter 10 where high frequency components of the data bit stream are removed prior to modulation of an RF signal. The output of low pass filter 10 is asserted at voltage controlled crystal oscillator (VCXO) 12, which frequency modulates the oscillator's RF signal in accordance with the data to be transmitted. As will be more fully explained below, VCXO 12 operates at a fundamental frequency that is one third of the transceiver's communication frequency.

The modulated RF output of VCXO 12 is asserted at frequency tripler 14 where harmonics, particularly the third harmonic, of the crystal oscillator signal are generated. The output of frequency tripler 14 is asserted at harmonic filter 16 which selectively passes the third harmonic (at the communication frequency of the transceiver). The RF signal from harmonic filter 16 is asserted at power amplifier 18 where the signal power is boosted to a level sufficient for transmission on the communications network. The signal from power amplifier 18 is coupled to antenna 20 which radiates the transmit signal.

Antenna 20 is also coupled to receiver 24 through blocking diode CR6 for reception of incoming signals on the network. Receiver 24 may be any conventional design, and thus it will not be described at length herein. Consistent with the overall design objectives of the transceiver of the present invention, receiver 24 is preferably based on a commercially available VLSI device such as a MC3362 device manufactured by Motorola.

Figure 2A:
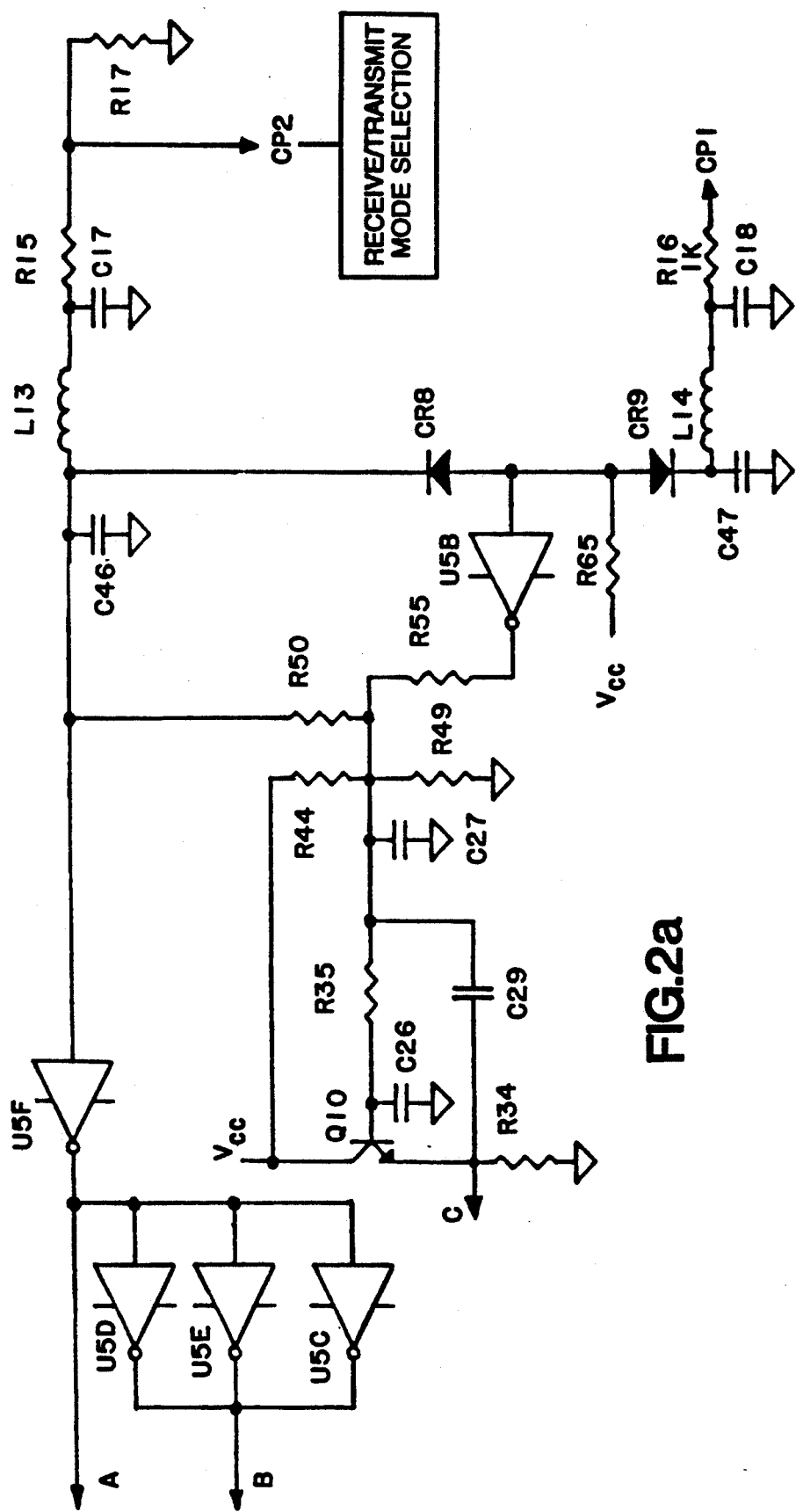
FIG. 2a is a schematic diagram of a circuit for the low pass filter section and for the transmit/receive switching control circuitry.

Referring now to FIGS. 2a–2e, circuitry for implementing a preferred embodiment of the transmit chain described generally above will be explained. The low pass filter section is shown in FIG. 2a. Digital data for transmission on the network is asserted at connector pin CP1. Such data comprises a stream of digital bits with logical ones and logical zeros represented by approximate nominal voltages of five volts and zero volts, respectively. The input data stream is conditioned by the network comprising resistor R16, inductor L14 and capacitors C18 and C47 and is applied to the input of inverter U5B through diode CR9. Diode CR9 is forward biased by $V_{cc}$ applied through resistor R65. High frequency components of the digital output of inverter U5B are removed by a low pass filter comprising resistors R34, R35, R44, R49 and R55; capacitors C26, C27 and C29 and transistor Q10. The output of the low pass filter is developed at the emitter of Q10 (signal C) and is supplied to the oscillator section described below.

A receive/transmit mode selection signal is input a pin CP2 and conditioned by the network comprising resistors R15 and R17, capacitors C17 and C46 and inductor L13. A logical zero at CP2 places the transceiver in the receive mode, whereas a logical one places the transceiver in the transmit mode. In the receive mode, diode CR8 is forward biased, thereby effectively grounding the input of inverter U5D and blocking any data that might be applied at pin CP1. The receive/transmit mode selection signal is applied to the input of inverter U5F whose output (signal A) is also applied to the inputs of inverters U5C, U5D and U5E. The outputs of these three CMOS gates are ganged together to supply current to the power amplifier section in the transmit mode as will be described below.

Figures 2B, 2C, 2D:
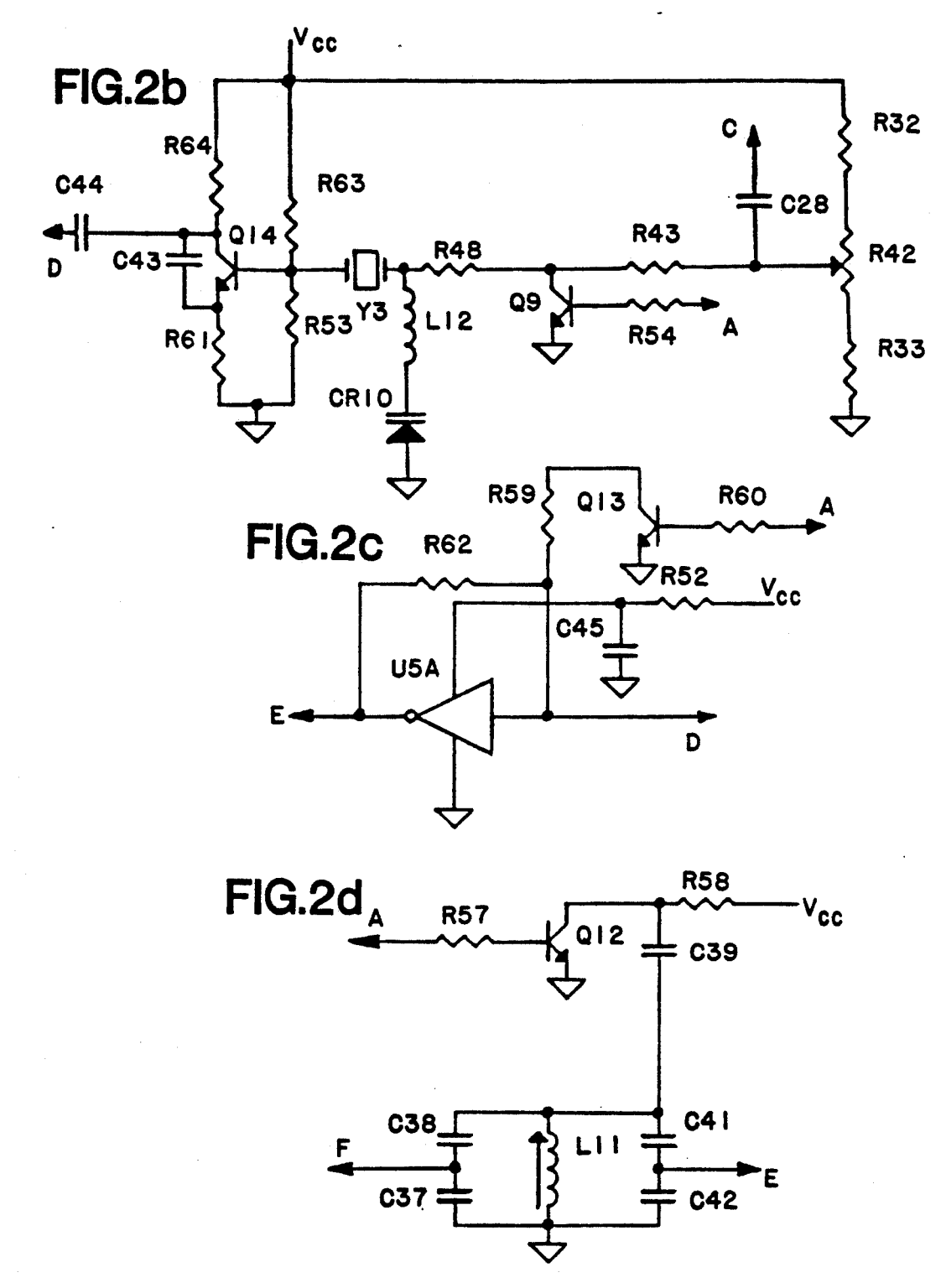

Referring next to FIG. 2b, a circuit for the voltage controlled crystal oscillator section is shown. VCXO 12 is driven by crystal Y3, which in the preferred embodiment operates at 16.628 MHz, one third of the nominal 49.885 MHz communications frequency. The operating frequency of VCXO 12 is adjustable by means of variable resistor R42. Signal C, the analog output of the low pass filter section, is coupled to the wiper contact of variable resistor R42 through capacitor C28. Since the frequency of the oscillator is a function of the voltage at the wiper contact of resistor R42, the data signal from the low pass filter frequency modulates the oscillator output signal which is developed at the collector of transistor Q14.

As mentioned above, VCXO 12 is designed using a fundamental series mode of crystal Y3 in such a way as to permit wide frequency pulling of the oscillator. In the receive mode, transistor Q9 is driven into conduction by the logical high state of the output of inverter U5F (signal A). This pulls the frequency of the oscillator off by approximately 50 kHz so that no significant harmonic of the free running oscillator interferes with signal reception during the receive mode.

Referring now to FIG. 2c, a circuit for the frequency tripler section is shown. The output of VCXO 12 (signal D) is asserted at the input of inverter U5A. Inverter U5A is operated as a non-linear amplifier to develop harmonics of the input signal, particularly the third harmonic which will drive the RF power amplifier. To provide additional isolation during the receive mode, the frequency tripler is selectively disabled. The input of inverter U5A is grounded through transistor Q13 in the receive mode, i.e., when signal A is a logical high, thereby preventing the generation of any harmonics of VCXO 12 during the receive mode.

Referring next to FIG. 2d, the output of inverter U5A (signal E) is applied to harmonic filter 16 which comprises capacitors C37, C38, C41 and C42 and inductor L11. The circuit values for these components are selected to pass the third harmonic of VCXO 12 at the communication frequency. Specific values for the preferred embodiment described herein are included in the table below. The harmonic filter is detuned from the communication frequency during the receive mode so as to suppress any residual energy at the communication frequency. This is accomplished by application of signal A to the base of transistor Q12 through resistor R57, causing transistor Q12 to turn on in the receive mode.

Figure 2E:
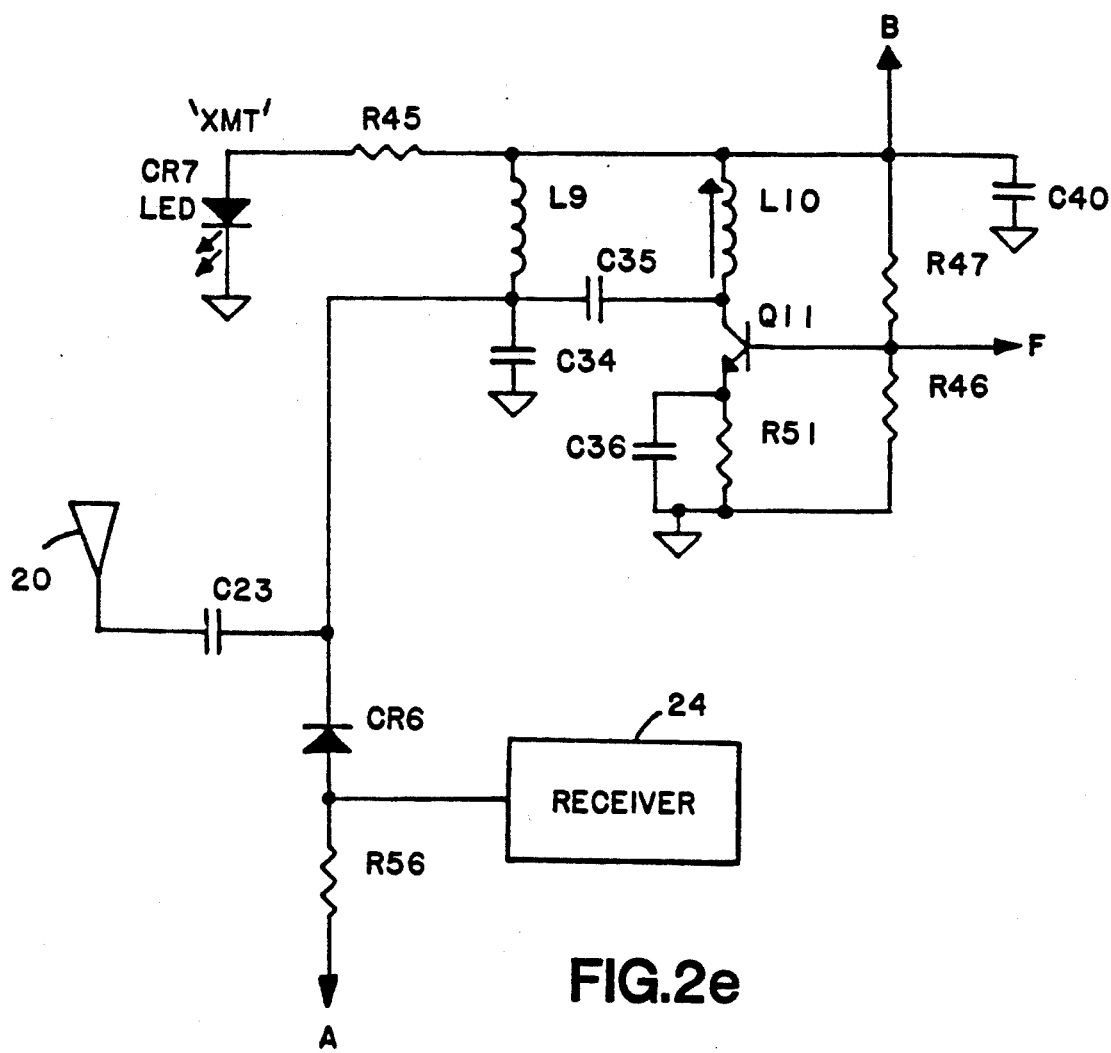
FIG. 2e is a schematic diagram of a circuit for the power amplifier section.

Circuitry for the power amplifier section is shown in FIG. 2e. The output of harmonic filter 16 (signal F) is applied to the base of transistor Q11. As mentioned above, collector current for the power amplifier is supplied by ganged inverters U5C–U5E (signal B). Accordingly, the current supply for the power amplifier is cut off during the receive mode, thereby selectively disabling the amplifier. An LED coupled to signal B through resistor R45 provides a visual indication when the transceiver is operating in the transmit mode.

The output of the power amplifier is coupled to antenna 20 through capacitor C23. Blocking diode CR6 prevents direct coupling of the transmit signal into receiver 24.

Values for the circuit components used in the preferred embodiment are as follows:

| Component | Value or part no. |
| --- | --- |
| R15, R16, R32, R33, R59, R61 | 1K |
| R17, R34, R57, R62 | 10K |
| R35 | 18K |
| R42 | 50K |
| R43, R54 | 200K |
| R44 | 51K |
| R45 | 390 |
| R46, R49 | 27K |
| R47 | 22K |
| R48, R53 | 33K |
| R50 | 120K |
| R51 | 47 |
| R52 | 5.1 |
| R55 | 82K |
| R56 | 4.3K |
| R58, R60, R65 | 100K |
| R63 | 68K |
| R64 | 200 |
| C17, C18, C37, C42 | 100 pF |
| C23, C36 | 1000 pF |

-continued

| Component | Value or part no. |
| --- | --- |
| C26 | 560 pF |
| C27 | 680 pF |
| C28 | 1 μF |
| C29 | 3900 pF |
| C34 | 82 pF |
| C35 | 56 pF |
| C38, C41 | 10 pF |
| C39 | 68 pF |
| C40, C44 | .01 μF |
| C43 | 22 pF |
| C45 | .1 μF |
| C46, C47 | 220 pF |
| L9 | 47 μH |
| L10 | 317 nH |
| L11 | 440 nH |
| L12 | 15 μH |
| L13, L14 | 220 μH |
| Q9, Q10, Q11, Q12, Q13, Q14 | 2N3904 |
| CR6, CR8, CR9 | 1N4148 |
| CR10 | MMBV105GL |
| U5 | 74HC04 |

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

I claim:

1. A transceiver having a receiver section and a transmitter section both coupled to an antenna for transmission and reception of electromagnetic signals at a communication frequency, and further having mode control means to place the transceiver in a receive mode for the reception of the electromagnetic signals and in a transmit mode for the transmission of the electromagnetic signals, said transmitter section comprising:
   oscillator means for generating a first electrical signal at a first fundamental frequency that is a submultiple of the communication frequency;
   frequency multiplier means coupled to the oscillator means for receiving the first electrical signal and generating a second electrical signal in response thereto at a second fundamental frequency nominally equal to the communication frequency;
   filter means coupled to the frequency multiplier means for receiving the second electrical signal and attenuating frequency components other than the communication frequency, thereby producing a filtered communication signal, wherein the filter means includes detuning means coupled to the mode control means for causing the filter means to attenuate the communication frequency in the receive mode;
   power amplifier means coupled to the filter means for receiving the filtered communication signal and for amplifying the power thereof, thereby producing an amplified communication signal;
   antenna coupling means for electrically connecting the amplified communication signal to the antenna.

2. The device of claim 1 wherein the first fundamental frequency is one third of the communication frequency.

3. The device of claim 2 wherein the communication frequency is in the range of 49 to 50 MegaHertz.

4. The device of claim 1 wherein the frequency multiplier means includes means coupled to the mode control means for selectively disabling the frequency multiplier means in the receive mode.

5. The device of claim 1 wherein the oscillator means includes frequency pull off means coupled to the mode control means for selectively causing the oscillator means to generate the first electrical signal at the frequency offset from said submultiple of the communication frequency in the receive mode.

6. The device of claim 5 wherein the frequency of the first electrical signal is offset from said submultiple of the communication frequency by at least 40 kiloHertz.

7. The device of claim 1 wherein the power amplifier means includes means coupled to the mode control means for selectively disabling the power amplifier means in the receive mode.

8. A transceiver having a receiver section and a transmitter section both coupled to an antenna for transmission and reception of electromagnetic signals at a communication frequency, mode control means to place the transceiver in a receive mode for the reception of the electromagnetic signals and in a transmit mode for transmission of the electromagnetic signals, said transmitter section comprising:
   oscillator means for generating a first electrical signal at a first fundamental frequency that is a submultiple of the communication frequency, the oscillator means including frequency pull off means coupled to the mode control means for selectively causing the oscillator means to generate the first electrical signal at a frequency offset from said submultiple of the communication frequency in the receive mode;
   frequency multiplier means coupled to the oscillator means for receiving the first electrical signal and generating a second electrical signal in response thereto at a second fundamental frequency nominally equal to the communication frequency, the frequency multiplier means including means coupled to the mode control means for selectively disabling the frequency multiplier means in the receive mode;
   filter means coupled to the frequency multiplier means for receiving the second electrical signal and attenuating frequency components other than the communication frequency, thereby producing a filtered communication signal, the filter means including detuning means coupled to the mode control means for causing the filter means to attenuate the communication frequency in the receive mode;
   power amplifier means coupled to the filter means for receiving the filtered communication signal and for amplifying the power thereof, thereby producing an amplified communication signal, the power amplifier means including means coupled to the mode control means for selectively disabling the power amplifier means in the receive mode; and
   antenna coupling means for electrically connecting the amplified communication signal to the antenna.

9. The device of claim 8 wherein the first fundamental frequency is one third of the communication frequency.

10. The device of claim 9 wherein the communication frequency is in the range of 49 to 50 MegaHertz.

11. In a transceiver having a receiver section and a transmitter section both coupled to an antenna for transmission and reception of electromagnetic signals at a communication frequency, the transmitter section including mans for generating a transmitter oscillator signal, power amplifier means for amplifying the transmitter oscillator signal to a transmission level, and a harmonic filter coupled between the means for generating the transmitter oscillator signal and the power amplifier means for attenuating harmonics of the communication frequency during the transmission of the electromagnetic signals, a method for isolating the receiver section from the transmitter section during reception of the electromagnetic signals comprising the steps of:

(a) generating the transmitter oscillator signal at a first fundamental frequency that is nominally a submultiple of the communication frequency;

(b) multiplying the frequency of the transmitter oscillator signal up to the communication frequency only when transmitting the electromagnetic signals; and (c) detuning the harmonic filter so as to attenuate the communication frequency within the harmonic filter during the reception of the electromagnetic signals.

12. The method of claim 11 further comprising the step of disabling the power amplifier means during the reception of the electromagnetic signals.

13. The method of claim 11 further comprising the step of pulling the frequency of the transmitter oscillator signal away from said submultiple of the communication signal during the reception of electromagnetic signals.

14. A transceiver comprising:

a transmitter section;

a receiver section;

an antenna coupled to both the transmitter and receiver sections for transmission and reception of electromagnetic signals at a communication frequency;

mode control means for placing the transceiver in a receive mode for the reception of the electromagnetic signals and in a transmit mode for the transmission of the electromagnetic signals;

the transmitter section including a selectively tunable harmonic filter tuned in the transmit mode to pass the communications frequency and attenuate harmonics of the communication frequency and tuned in the receive mode to attenuate the communication frequency.

* * * * *

UNITED STATES PATENT AND TRADEMARK OFFICE
CERTIFICATE OF CORRECTION

PATENT NO.    : 5,239,686

DATED         : August 24, 1993

INVENTOR(S)   : Walter J. Downey

It is certified that error appears in the above-identified patent and that said Letters Patent is hereby corrected as shown below:

In column 8 at line 6 delete "transceiver" and insert --transmitter--

Signed and Sealed this

Seventh Day of October, 1997

Attest:

BRUCE LEHMAN

Attesting Officer

Commissioner of Patents and Trademarks